(12) United States Patent
Bridgewater

(10) Patent No.: US 8,585,291 B2
(45) Date of Patent: Nov. 19, 2013

(54) AIRCRAFT BEARING ASSEMBLY

(75) Inventor: Robert Bridgewater, Bristol (GB)

(73) Assignee: Airbus Operations Limited, Bristol (GB)

( * ) Notice: Subject to any disclaimer, the term of this patent is extended or adjusted under 35 U.S.C. 154(b) by 100 days.

(21) Appl. No.: 13/209,735

(22) Filed: Aug. 15, 2011

(65) Prior Publication Data

US 2012/0051679 A1    Mar. 1, 2012

(30) Foreign Application Priority Data

Aug. 26, 2010    (GB) .................................. 1014213.1

(51) Int. Cl.
*F16C 23/04*      (2006.01)
*F16C 23/08*      (2006.01)
*F16C 32/02*      (2006.01)

(52) U.S. Cl.
USPC ............ 384/203; 384/206; 403/128; 403/136

(58) Field of Classification Search
USPC ................. 403/122–144; 248/56, 516, 181.1,
248/181.2; 254/101, 129, 134; 384/145,
384/206–214, 247, 498, 203; 244/99.2,
244/99.3, 102 R, 102 A, 102 SS
See application file for complete search history.

(56) References Cited

U.S. PATENT DOCUMENTS

| | | | |
|---|---|---|---|
| 2,952,901 A | 9/1960 | King | |
| 3,108,830 A * | 10/1963 | Fierstine | 403/140 |
| 3,224,821 A * | 12/1965 | Barr | 384/484 |
| 5,752,780 A * | 5/1998 | Dorr | 403/135 |
| 5,915,842 A * | 6/1999 | Redinger | 384/203 |
| 6,672,788 B2 * | 1/2004 | Hathaway | 403/90 |
| 8,282,305 B2 * | 10/2012 | Rechtien et al. | 403/131 |
| 2003/0081989 A1 * | 5/2003 | Kondoh | 403/135 |
| 2005/0105961 A1 * | 5/2005 | Kondoh | 403/122 |
| 2006/0127168 A1 * | 6/2006 | Kondoh | 403/122 |
| 2007/0137367 A1 | 6/2007 | Papa et al. | |
| 2007/0212165 A1 * | 9/2007 | Rechtien et al. | 403/132 |
| 2010/0040407 A1 * | 2/2010 | Rechtien et al. | 403/122 |
| 2011/0023283 A1 | 2/2011 | Blachon | |

FOREIGN PATENT DOCUMENTS

| | | |
|---|---|---|
| CH | 336231 A | 2/1959 |
| EP | 1605173 | 12/2005 |
| EP | 2261521 A1 | 12/2010 |
| FR | 2311220 | 5/1975 |

OTHER PUBLICATIONS

Extended European Search Report for GB 11177657.1, dated Feb. 16, 2012.
UK Search Report for Application No. GB1014213.1 mailed Nov. 15, 2010.

* cited by examiner

*Primary Examiner* — Alan Waits
(74) *Attorney, Agent, or Firm* — Lowe Hauptman & Ham, LLP

(57) ABSTRACT

An aircraft spherical bearing assembly comprises a first part which is in sliding contact with an intermediate part for sliding therebetween to form a spherical joint. A second slip path is provided between the intermediate component and an outer component which can be selectively actuated when the force through the first slip path exceeds a predetermined level.

11 Claims, 6 Drawing Sheets

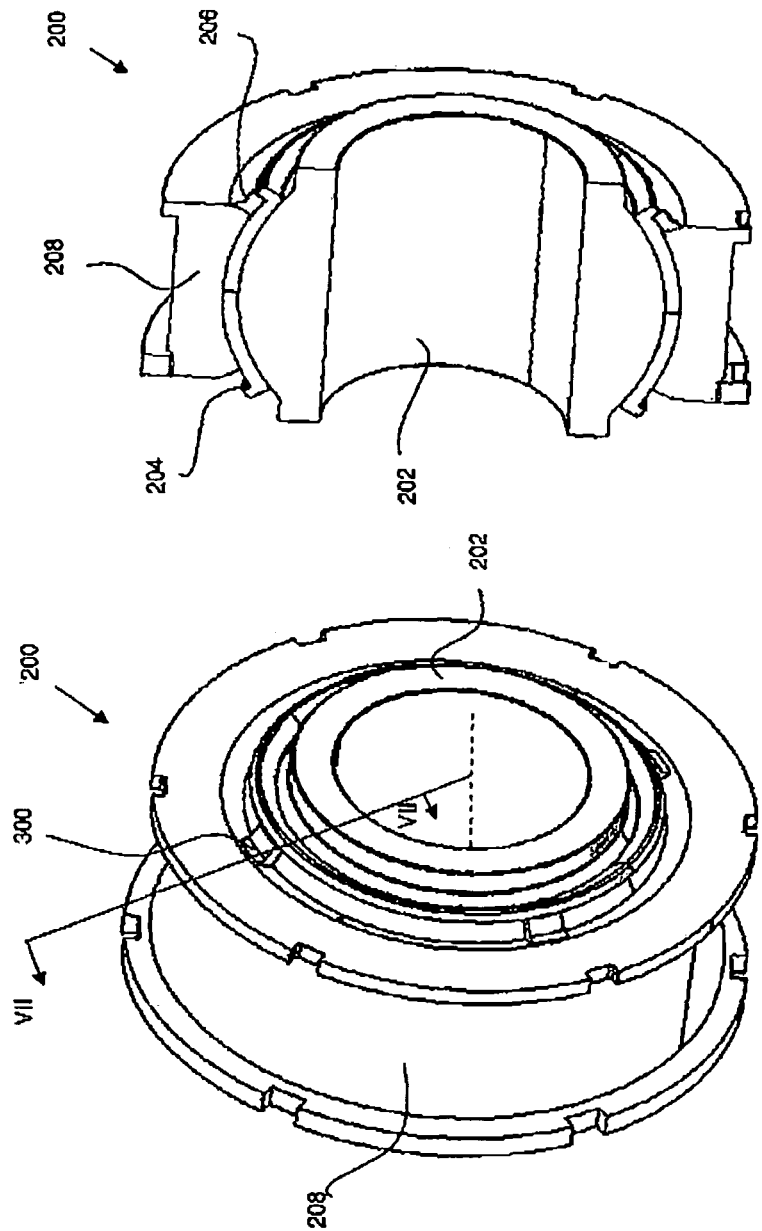

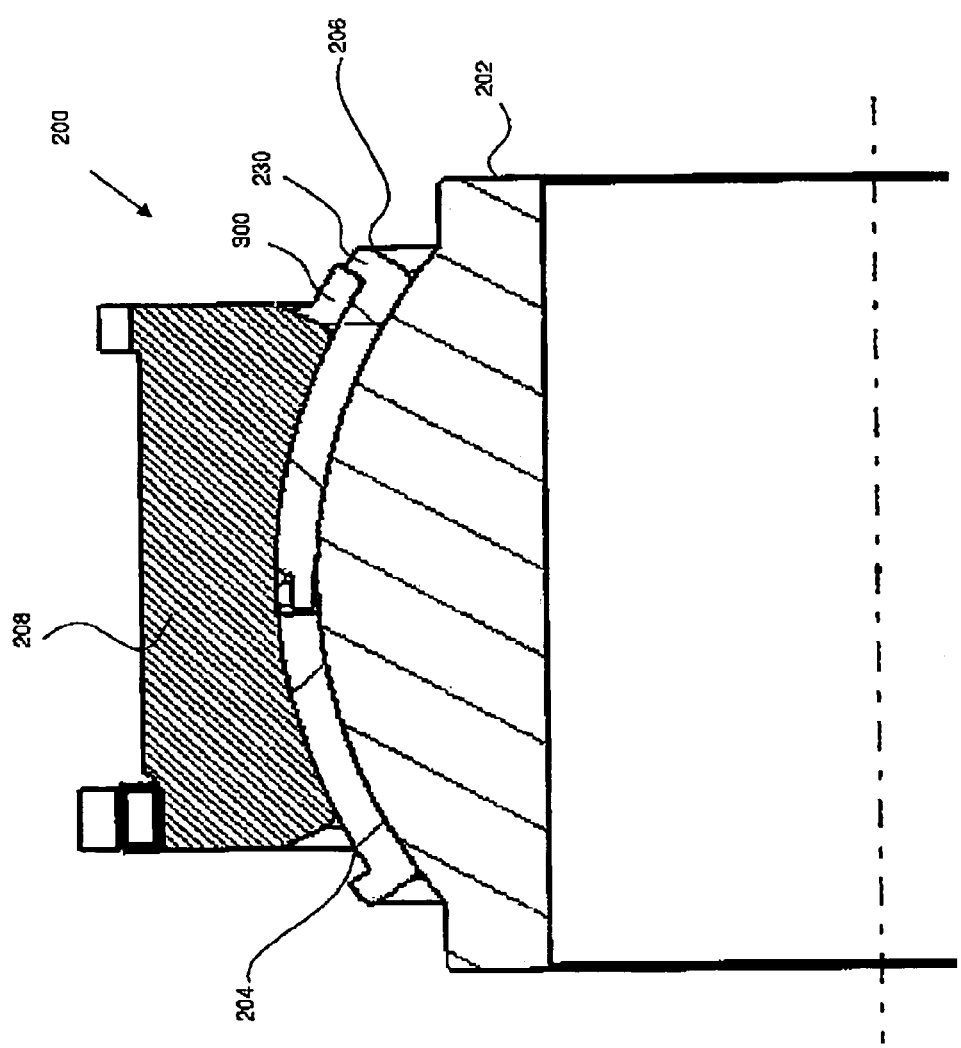

AIRCRAFT BEARING ASSEMBLY

RELATED APPLICATIONS

The present application is based on, and claims priority from, Great Britain Application Number 1014213.1, filed Aug. 26, 2010, the disclosure of which is hereby incorporated by reference herein in its entirety.

The present invention relates to an aircraft bearing assembly. More specifically, the present invention relates to an aircraft spherical bearing assembly having two parallel slip paths.

The desired motion of an aircraft control surface in-use may not be pure rotation about a primary axis. Rotation may simultaneously occur about other axes perpendicular to the first. Such bi-axial rotation may occur where components experience strains under the influence of external temperatures and/or forces.

In order to account for such motion, spherical bearings have been used in aircraft. Such bearings permit primary rotation about a first axis and simultaneous secondary rotation about axes perpendicular to the primary axis, i.e. a "slip path". In doing so, motion about axes perpendicular to the primary axis can be accounted for without causing undue stresses and strains.

Spherical bearings generally comprise two part-spherical surfaces in sliding contact with each other.

Under certain circumstances the friction between the two part-spherical surfaces of the bearing can rise. This may occur, for example, due to geometrical changes or wear. This is undesirable because an increase in friction leads to an increase in actuator power consumption. This is undesirable as the overall efficiency of the aircraft will be detrimentally affected.

It is an object of the present invention to overcome, or at least mitigate, the above problem.

According to a first aspect of the invention there is provided an aircraft spherical bearing assembly comprising a first part, a second part and an intermediate part, in which the first part is coupled to the intermediate part to form a first spherical joint about a first centre point, and the intermediate part is coupled to the second part to form a second spherical joint about a second centre point, wherein the first and second centre points are substantially coincident.

Advantageously, a second slip path is provided between the intermediate part and the second part. Provision of a second slip path provides sliding motion should the friction force between the first part and the intermediate component (i.e. the first slip path) rise.

By "substantially coincident" we mean that the centres of rotation of the slip paths are in approximately the same place such that there is little functional difference between the articulation of the spherical joint regardless of which slip path is active. At the very least, the centre points of the two slip paths should sit within an area defined by the mating surfaces of those slip paths when viewed in section through a primary axis of rotation of the spherical joint.

Preferably, the intermediate part and the second part are configured to be rotationally fixed relative to each other below a predetermined torque and rotationally free relative to each other above the predetermined torque.

Advantageously, if the frictional force between the first part and the intermediate part increases above the predetermined torque the second slip path will activate and the bearing friction will drop to an acceptable level.

An example aircraft spherical bearing assembly according to the present invention will now be described in accordance with the accompanying figures, in which:—

FIG. 5 is a perspective view of a second bearing assembly in accordance with the present invention;

FIG. 6 is perspective section view of the bearing assembly of FIG. 5; and

FIG. 7 is a close-up side section view of the bearing assembly of FIG. 5 along line VII-VII.

Figure 1:
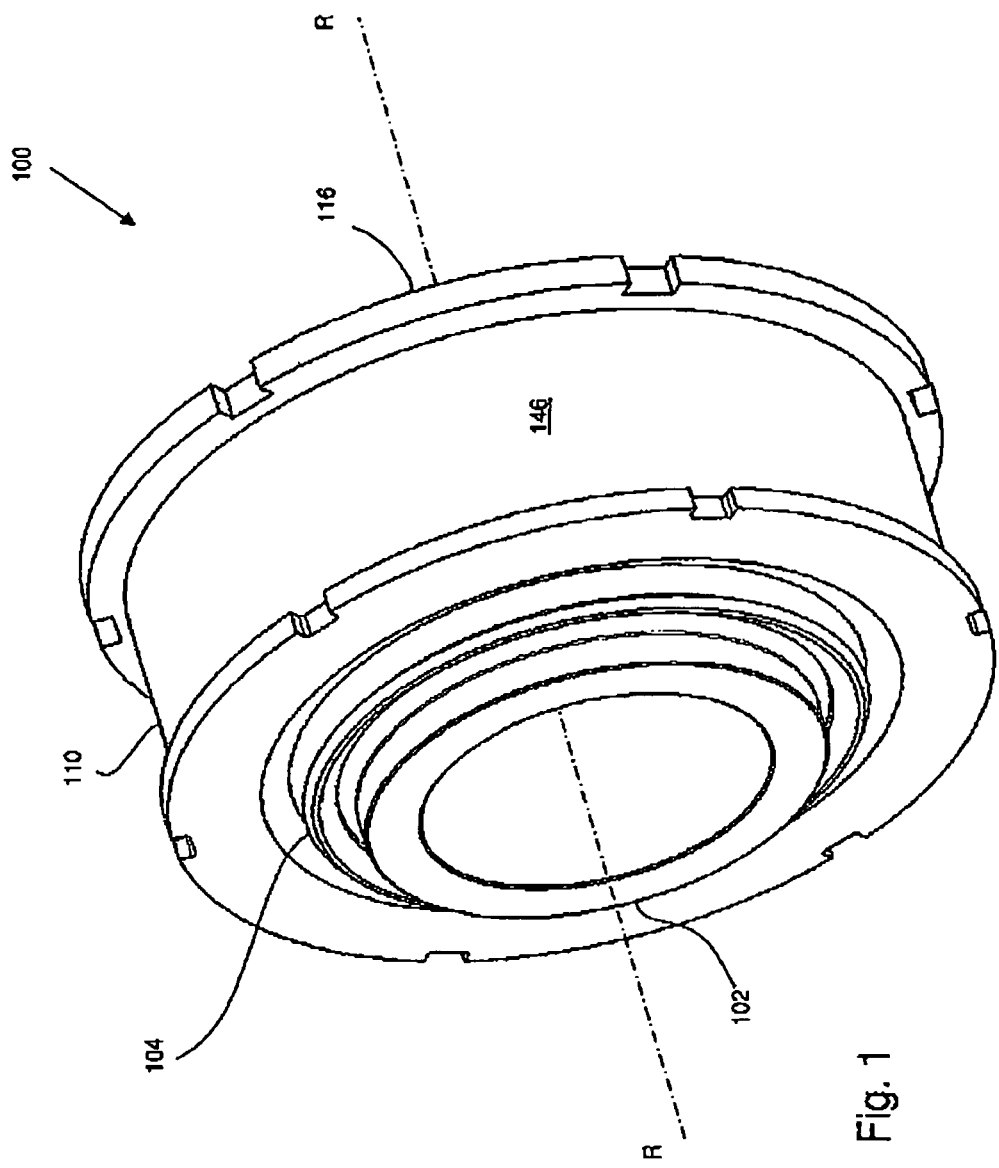
FIG. 1 is a perspective view of a first bearing assembly in accordance with the present invention.
Figure 2:
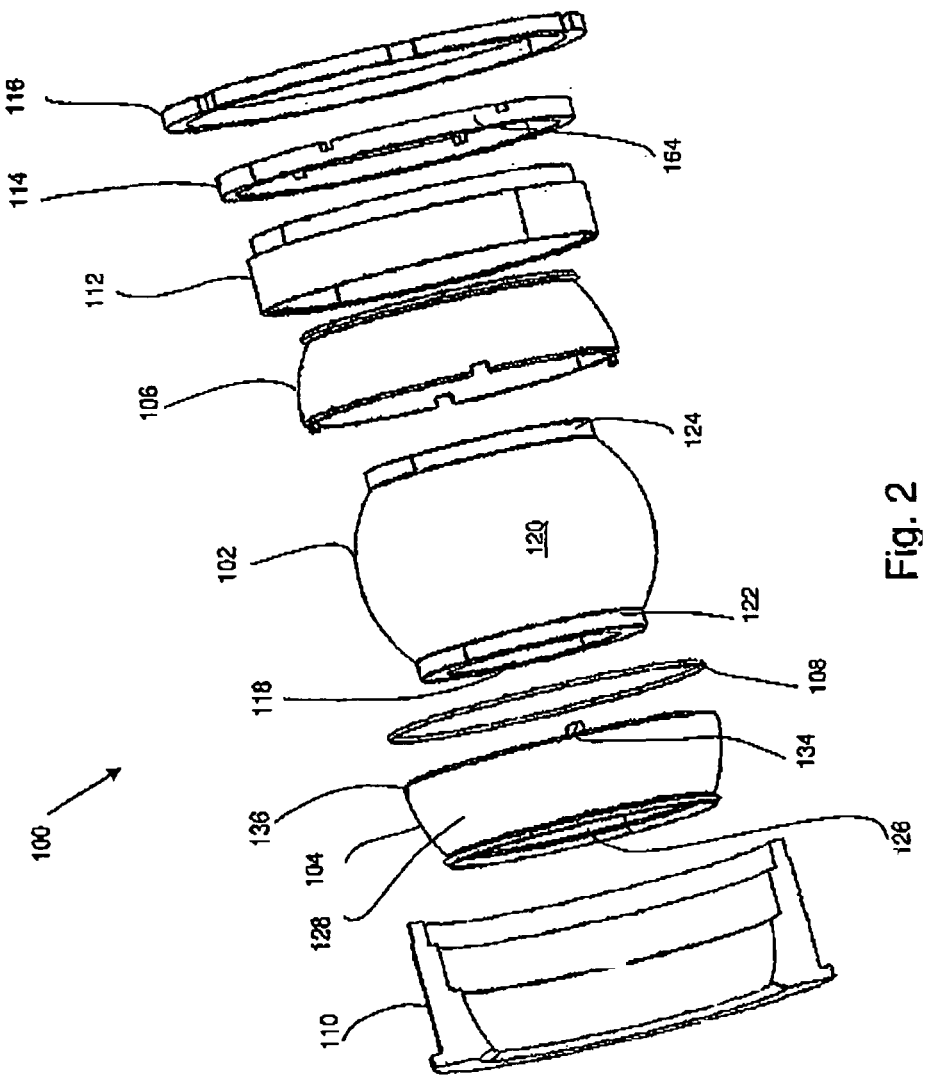
FIG. 2 is an exploded perspective view of the bearing assembly of FIG. 1.

Referring to FIGS. 1 to 4, there is provided a spherical bearing assembly 100 comprising a bearing ball part 102, an intermediate part comprising a first half shell 104 and a second half shell 106 and a spring wire 108. A bearing housing comprises an outer housing 110, an inner housing 112, an inner housing retainer 114 and a bearing retention nut 116.

The bearing ball part 102 comprises a substantially cylindrical bore 118 and a spherical outer surface 120. The cylindrical bore 118 defines a rotation axis R. The spherical outer surface 120 comprises an annular ring 122, 124 at either end. Both annular rings are parallel, offset and oriented about the axis R.

Figure 3:
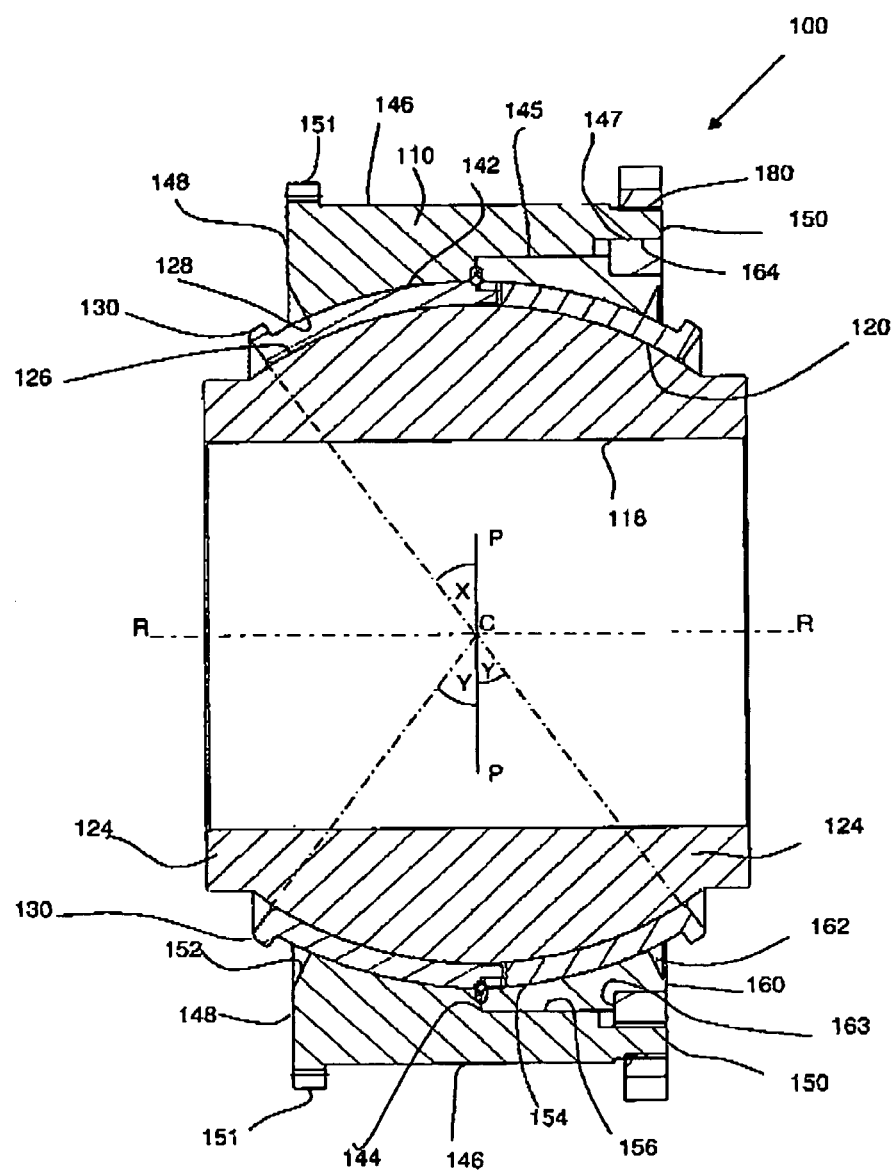
FIG. 3 is a side section view of the bearing assembly of FIG. 1.

The first half shell 104 defines a spherical inner surface 126 and a spherical outer surface 128 both of which have a substantially identical geometric centre point C which lies on the axis R as shown in FIG. 3. The inner and outer surfaces 126, 128 terminate at a vertical plane P coincident with centre point C, which vertical plane P is perpendicular to the axis R. The surfaces 126, 128 terminate at their other ends at an angle X from the plane P of approximately 30 degrees as shown in FIG. 3. The first half shell 104 terminates in a radial lip 130 which extends radially outwardly from the spherical outer surface 128.

At the opposite end, where the first half shell 104 terminates there is a circumferential, tangentially extending groove 132, the function of which will be described below. Two diametrically opposed engagement tabs 134 extend from the circumferential edge of the first half shell 104. A pair of diametrically opposed grooves 136 are positioned at 90 degrees to the tabs 134.

Figure 4:
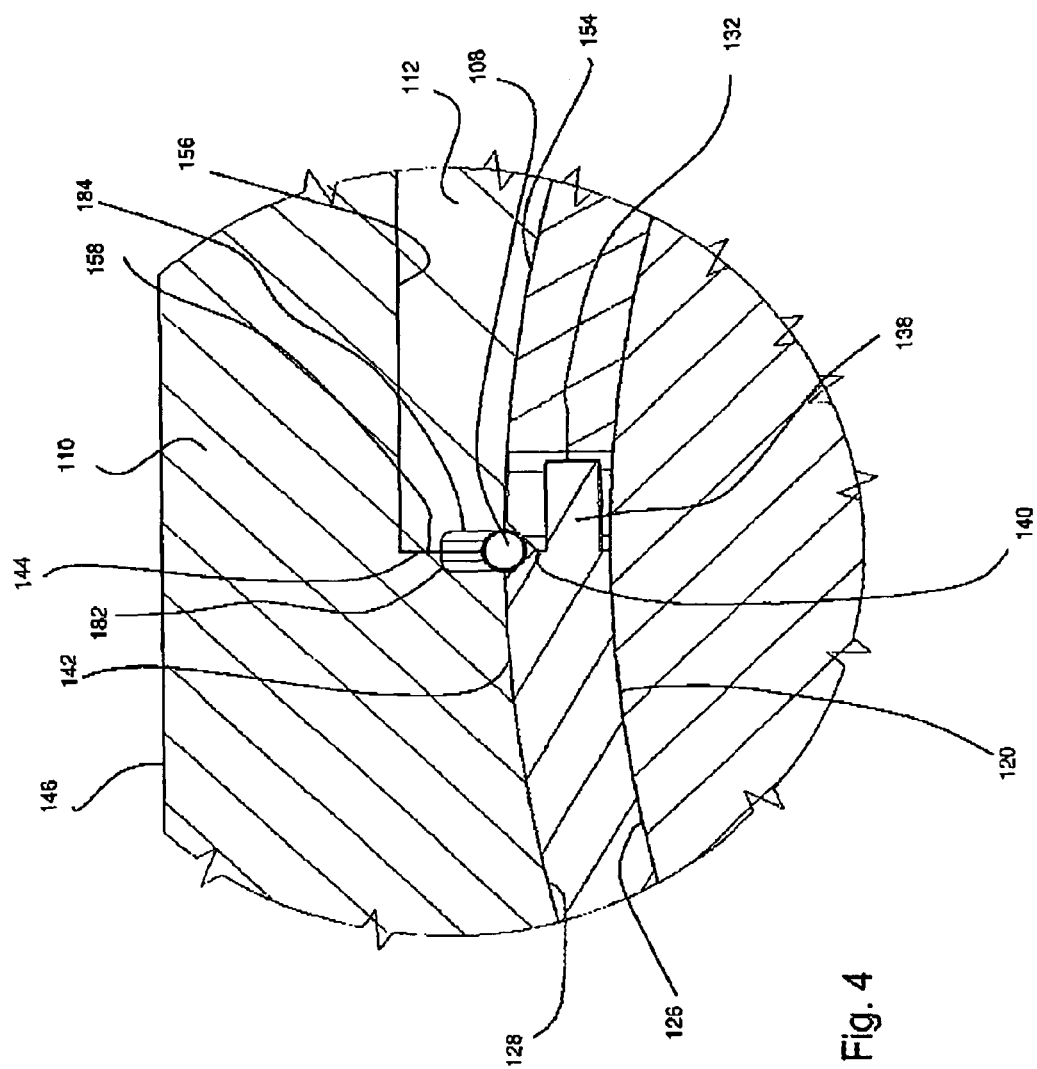
FIG. 4 is a close-up side section view of the bearing assembly of FIG. 1.

The second half shell 106 is substantially a mirror image of the first half shell 104. The difference between the first half shell 104 and the second half shell 106 is that the second half shell 106 defines a circumferential tangentially extending tongue 138 instead of the groove 132. As shown in FIG. 4, the tongue 138 is configured to engage with the groove 132.

Each of the first and second half shells 104, 106 defines half of a circumferential "V" shaped groove 140 at their peripheries, the function of which will be described below.

The outer housing 110 is generally ring shaped defining a part-spherical inner surface 142 having substantially the same geometric centre point C and diameter as the surfaces 126, 128.

The outer edge of the outer housing 110 is defined by a cylindrical outer surface 146 extending between a first exterior annular wall 148 and a second exterior annular wall 150. The first exterior annular wall 148 joins the spherical inner surface 142 and the cylindrical outer surface 146. A generally radially extending undercut 152 is provided in the region of the join between the first external annular wall 148 and the spherical inner surface 142. The function of the undercut 152 will be described below.

At the opposite end of the cylindrical outer surface 146 to the first exterior annular wall 148 there is a threaded external portion 180 proximate the second exterior annular wall 150.

An annular inner wall 144 extends from the spherical inner surface 142 towards the cylindrical outer surface 146 and is joined to the second exterior annular wall 150 by a first stepped portion 145 and a second stepped portion 147. The second stepped portion 147 is internally threaded.

The outer housing defines a notch 182 (see FIG. 4) between the annular wall 144 and the spherical surface 142.

The inner housing 112 defines an inner spherical surface 154 and an outer cylindrical surface 156. The inner spherical surface 154 extends from the plane P, has a geometrical centre point at centre point C and terminates at the angle Y. The inner housing 112 further comprises a first annular surface 158 and a second annular surface 160. A generally radially extending undercut radial surface 162 extends from the outer annular surface 160 to the inner spherical surface 154, whose function will be described below.

The outer cylindrical surface 156 and the inner housing 112 is stepped defining an annular shoulder 163 whose function will be described below.

The inner housing 112 defines a notch 184 between the annular surface 158 and the inner spherical surface 154.

The inner housing retainer 114 is a substantially cylindrical component having an outer threaded surface 164.

The spherical bearing assembly 100 is assembled as follows. The first half shell 104 is placed with the inner spherical surface 126 in sliding contact with the outer spherical surface 120 of the bearing ball part 102. The spring wire 108 is placed against the end of the first half shell 104 as shown in FIG. 4. The second half shell 106 is then clipped into position against the first half shell 104 by engaging the tongue 138 with the groove 132. The tabs 134 and grooves 136 co-operate to lock the half shells 102, 104 together. The spring wire 108 is thereby trapped in the "V" shaped groove 140 as shown in FIG. 4. It will be noted that although the spring wire 108 sits within the groove 140 in a rest position, it is sufficiently deformable such that it can expand and "pop" out of the groove 140 upon exertion of a significant and predetermined tangential force.

The outer housing 110 is then positioned over the first half shell 104 such that the spherical surfaces 142, 128 are in contact. The inner housing 112 is then slid within the outer housing 110 with the inner annular surface 158 positioned against the annular edge 144. The inner housing is held in position by threading the inner housing retainer 114 to engage the threaded cylindrical surface 147 of the outer housing 110 and abut the shoulder 163.

The notches 182, 184 co-operate to define an annular groove directly opposite the "V" shaped notch 140. The annular groove formed by the notches 182, 184 is dimensioned such that the spring wire 108 can fully enter it if it deforms radially outwardly as will be described below.

The bearing retention nut 116 is threaded onto the threaded part 180 of the cylindrical surface 146 of the outer housing 110 in order to retain the bearing assembly 100 in use.

In use, a shaft is inserted through the cylindrical bore 118 to rotate about axis R. Any rotation about axes perpendicular to axis R are accounted for by the first slip path, i.e. sliding contact between the spherical surface 120 of the bearing ball part 120 and the inner spherical surfaces 126, of the first and second half shells 104, 106.

It will be noted that during normal motion of the first slip path torque is transmitted between the housing parts 110, 112 and the half shells 102, 104 through the spring wire 108 which, as shown in FIG. 4, prevents relative movement of those two components.

The motion of the bearing ball part 102 relative to the half shells 104, 106 is limited by abutment of the annular rings 122, 124 against the radial lips 130 of the half shells 104, 106.

Should the level of friction in the first slip path rise to an undesirable level, a significant torque will be through the spring wire 108. Once the torque exceeds a pre-determined level (which can be tuned dependent upon the properties of the wire 108), the spring wire 108 will expand and "pop" out of the groove 140 into the annular groove 182, 184. As it does so, it frees the second slip path between the outer spherical surfaces 128 of the first and second half shells 104, 106 and the interior spherical surfaces 142, 154 of the inner and outer housings 110, 112 respectively. This secondary slip path offers a reduced level of friction compared to a deteriorated slip path between the bearing bore and the half shells and restores normal use.

During movement via the secondary slip path, the motion of the half shells 104, 106 relative to the housing components 110, 112 is limited by abutment of the radial lips 130 against the undercuts 152, 162.

As such, the half shells act as an intermediate component offering an alternative, second, slip path should friction increase to an undesirable level.

Turning to FIGS. 5 to 7, a similar arrangement is shown in which a second embodiment of a spherical bearing assembly 200 comprises an inner bearing ball part 202, a first half shell 204, a second half shell 206, and a housing 208. The spherical bearing assembly 200 does not utilise a spring wire 108. Rather, a series of four detachable segments 300 are positioned between the housing 208 and a radial lip 230 of the second half shell 206. During normal use the segments 300 constrain the relative motion between the half shells 204, 206 and the housing 208. Should the friction between the bearing ball 202 and the half shells 204, 206 rise above a pre-determined level then the segments 300 will simply snap off in order to permit relative sliding motion between the housing 208 and the half shells 206 thus freeing the second slip path.

Variations of the above embodiments fall within the scope of the present invention.

For example, various arrangements of frangible and/or selectably deformable elements can be used in order to activate the second slip path between the half shells 204, 206 acting as an intermediate component and the housing 208. It is envisaged that such components may be resettable to avoid the need for replacement after activation of the second load path.

An advantage of the second embodiment is that the segments 300 are visible in use and, as such, a service engineer can easily see when the second slip path has been used and replace the bearing 200 if necessary.

The invention claimed is:
1. An aircraft spherical bearing assembly comprising:
a first part, a second part and an intermediate part, in which the first part is coupled to the intermediate part to form a first spherical joint about a tint centre point, and the intermediate part is coupled to the second part to form a second spherical joint about a second centre point, the first and second centre points being substantially coincident;

the aircraft spherical bearing assembly comprising a separate load sensing element positioned between the intermediate part and the second part to provide a primary load path therebetween, wherein below a predetermined torque the separate load sensing element is in a first position to provide a positive connection between the intermediate part and the second part to prevent rotation of the second part relative to the intermediate part; and, wherein above the predetermined torque the separate load sensing element moves to a second position to permit rotation of the second part relative to the intermediate part.

2. An aircraft spherical bearing assembly according to claim 1 in which the separate load sensing element comprises a deformable element.

3. An aircraft spherical bearing assembly according to claim 2 in which the deformable element is a resilient element.

4. An aircraft spherical bearing assembly according to claim 3 in which the deformable element is a circular spring wire.

5. An aircraft spherical bearing assembly according to claim 1 in which the separate load sensing element is positioned to be visible from outside of the assembly.

6. An aircraft spherical bearing assembly according to claim 1 in which the first part is an inner part of the spherical bearing assembly and the second part is an outer part of the spherical bearing assembly.

7. An aircraft spherical bearing assembly according to claim 6 in which the intermediate part comprises an internal spherical bearing surface in sliding contact with an external spherical bearing surface of the first part.

8. An aircraft spherical bearing assembly according to claim 6 in which the intermediate part comprises an external spherical bearing surface in sliding contact with an internal spherical bearing surface of the second part.

9. An aircraft spherical bearing assembly comprising:
a first part, a second part and an intermediate part, in which the first part is coupled to the intermediate part to form a first spherical joint about a first centre point, and the intermediate part is coupled to the second part to form a second spherical joint about a second centre point, wherein the first and second centre points being substantially coincident;

wherein a load sensing element is positioned between the intermediate part and the second part to provide a primary load path therebetween;

wherein below a predetermined torque the separate load sensing element is in a first position to provide a positive connection between the intermediate part and the second part to prevent rotation of the second part relative to the intermediate part;

wherein above the predetermined torque the separate load sensing element moves to a second position to permit rotation of the second part relative to the intermediate part;

wherein the loud sensing element comprises a deformable element; and, wherein the deformable element is simultaneously positioned within facing recesses in mating surfaces of the intermediate part and the second part below the predetermined torque, and urged into one of the facing recesses when the predetermined torque is exceeded.

10. An aircraft spherical bearing assembly according to claim 9 in which the deformable element is a resilient element.

11. An aircraft spherical bearing assembly according to claim 10 in which the deformable element is a circular spring wire.

* * * * *